Patented Dec. 16, 1930

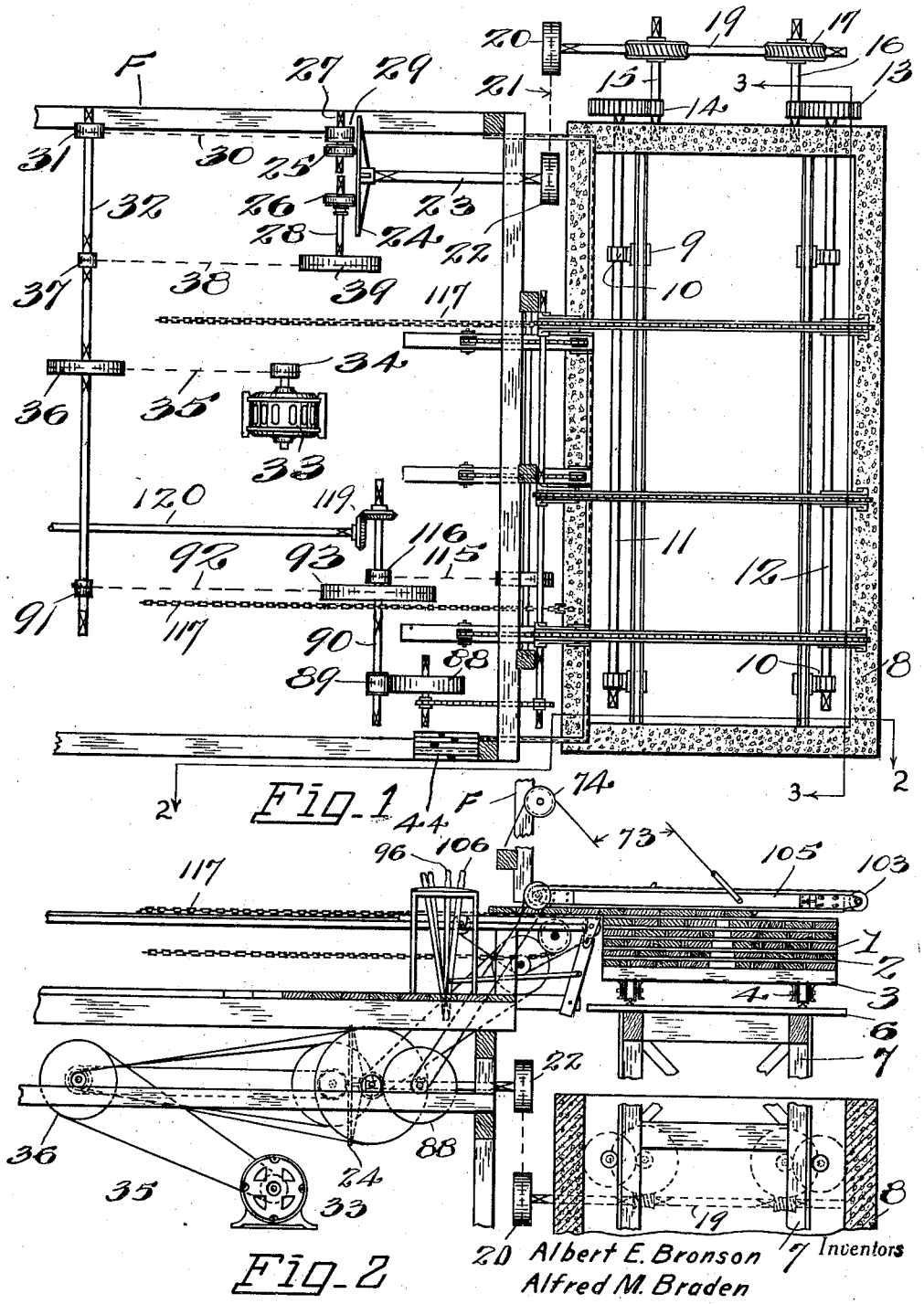

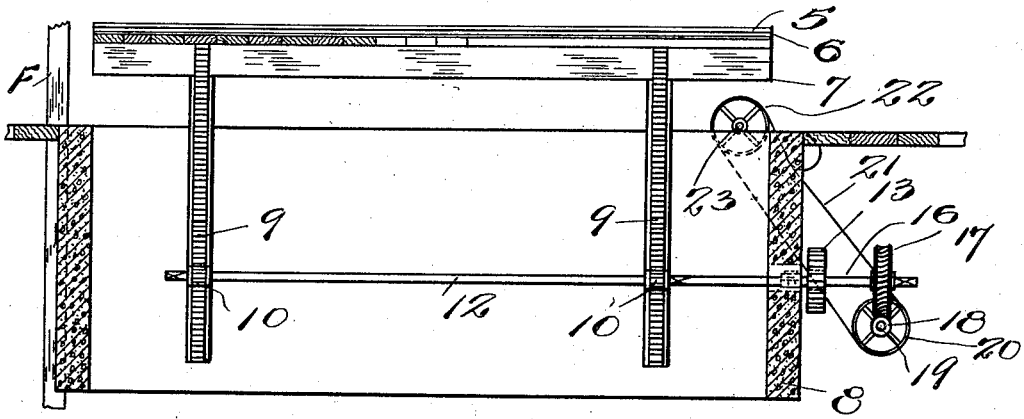
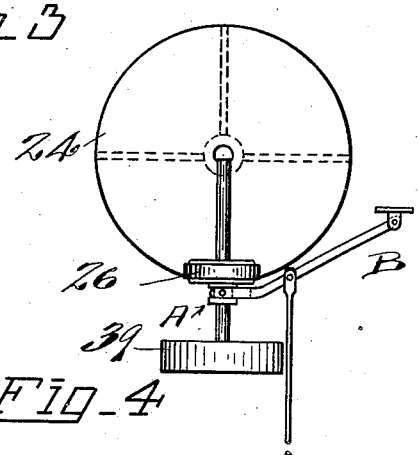
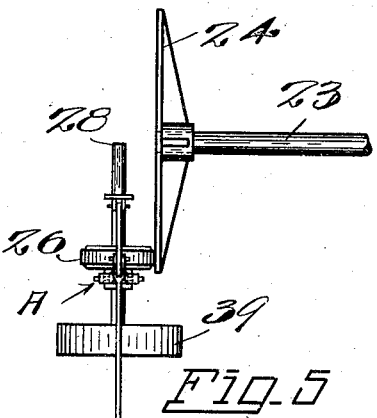
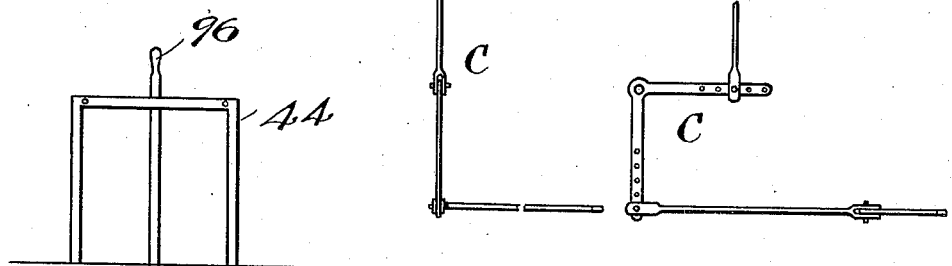
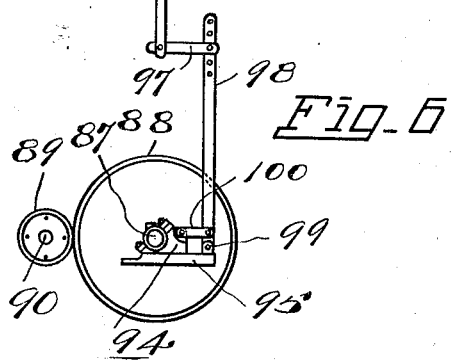

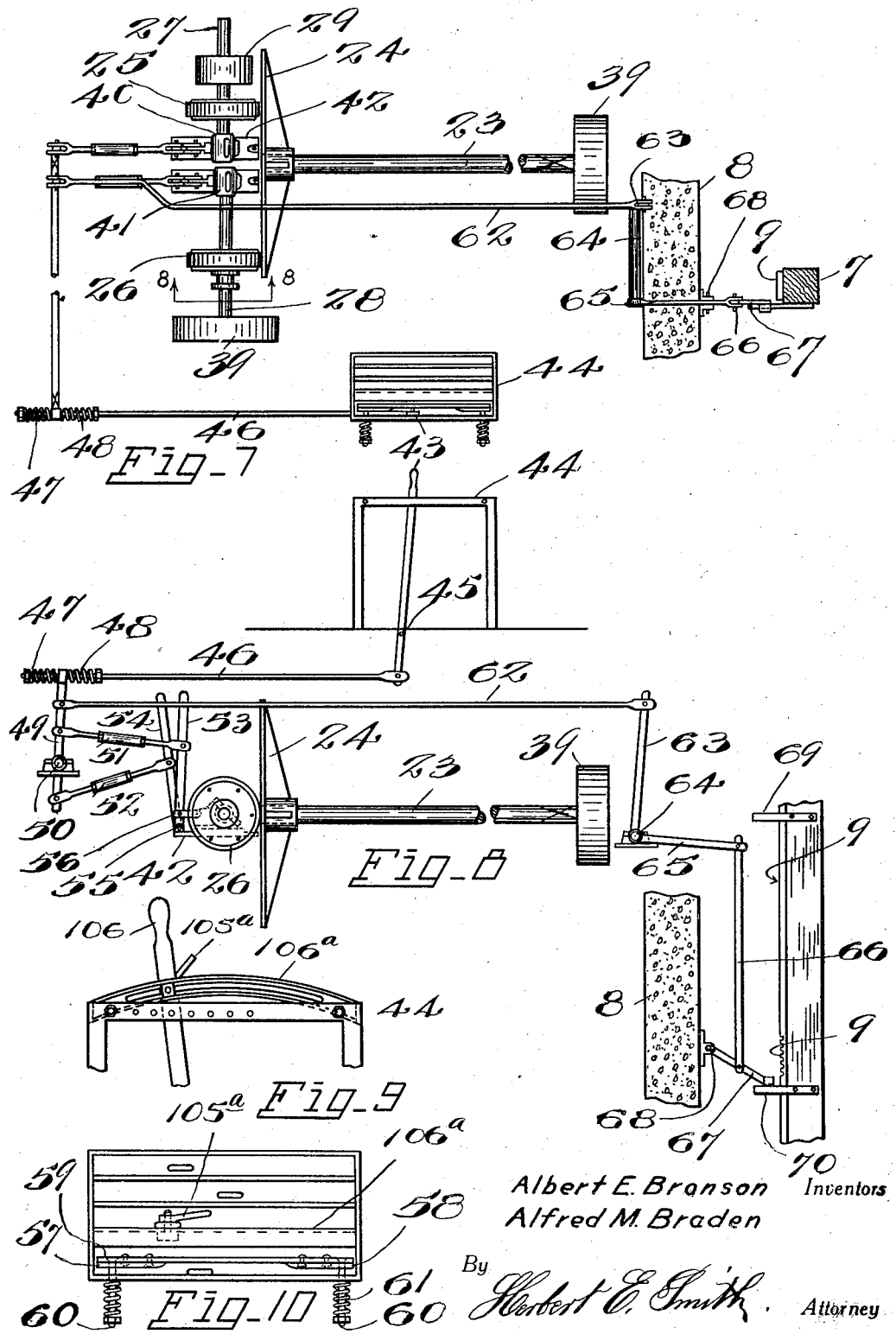

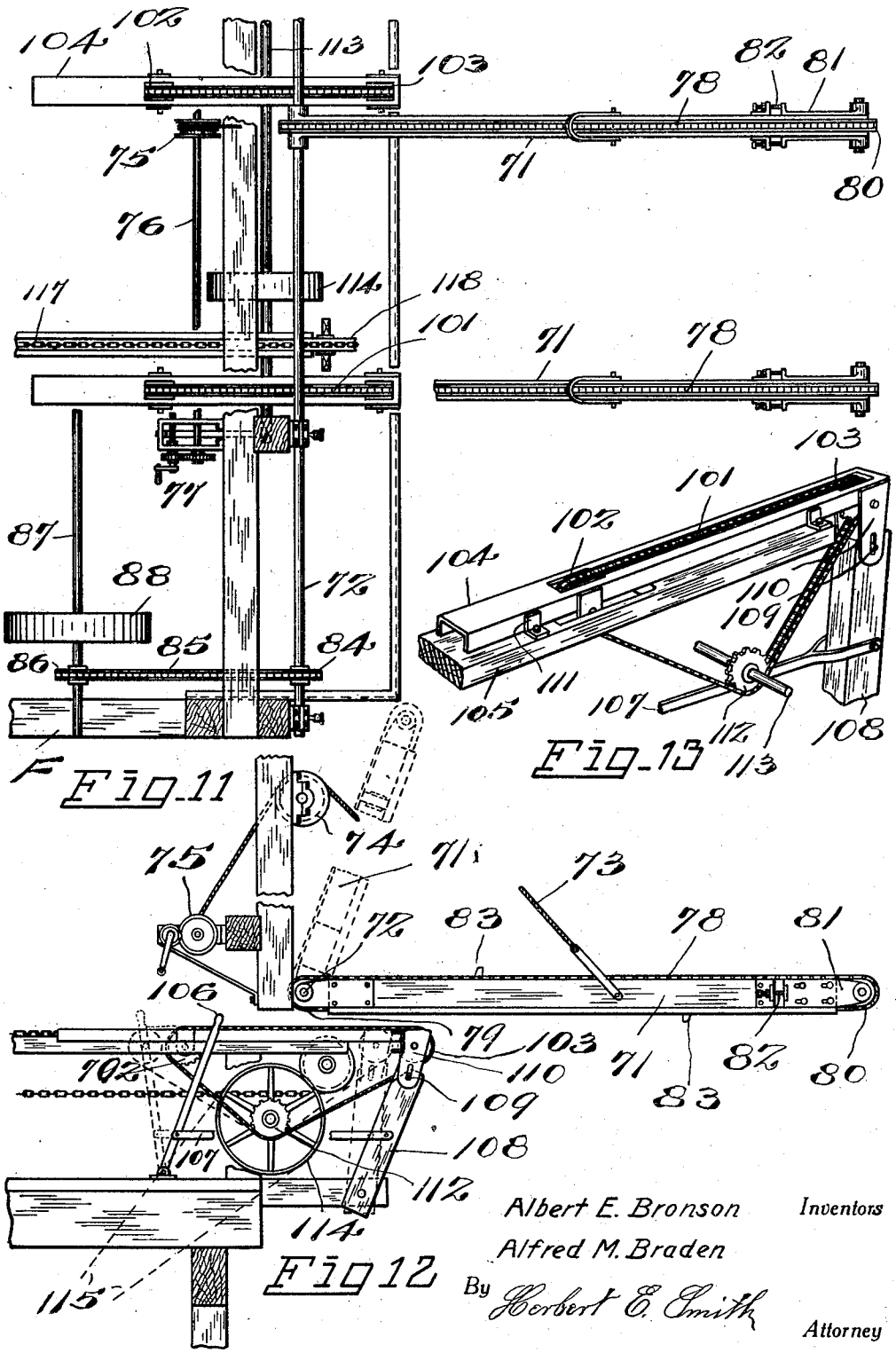

1,785,374

UNITED STATES PATENT OFFICE

ALBERT E. BRONSON AND ALFRED M. BRADEN, OF GIBBS, IDAHO, ASSIGNORS TO UNION IRON WORKS, OF SPOKANE, WASHINGTON

UNSTACKING MACHINE

Application filed July 16, 1928. Serial No. 293,209.

Our invention relates to improvements in unstacking machines which, while capable of use in various ways, is especially designed for unstacking lumber. In carrying out our invention the lumber, which has previously been stacked on a truck, or other suitable vehicle, is carried to the unstacking machine on the vehicle and the latter is run upon an uplifted elevator. The elevator, with its loaded vehicle or carrier is then lowered, as into a pit, and subsequently the loaded elevator is gradually, or intermittently raised, as the lumber or boards are unstacked in courses or layers from the carrier or vehicle. The uppermost course or layer of boards is pushed or moved laterally from the stack and endless unstacking chains are provided for this purpose, which chains push or shove the course or layer of boards upon a series of feed chains. The feed chains deliver the boards in successive order to off-bearing chains or conveyers, and the latter convey the boards to their destination.

The off-bearing or conveyer chains which receive the boards from the feed chains, are operated to travel at a greater speed than the latter so that the successive boards delivered to the conveyer chains are deposited thereon at spaced intervals. By this spacing arrangement of the boards upon the conveyer chains, the top surface and two opposite edges of each board are exposed to view so that an inspection may be made of the moving boards for grading purposes.

The unstacking chains are carried upon pivoted or hinged frames, that may be raised, lowered, and adjusted relatively to the elevator mechanism, by manually controlled means. The elevator, unstacking chains, feed chains and bearing-off or conveyer chains are all driven or operated from a single motor, through friction devices, under manual control, as will be described. The invention consists in certain novel combinations and arrangements of parts involving these elements of the machine as will hereinafter be more fully set forth and claimed.

In the accompanying drawings we have illustrated one complete example of the physical embodiment of our invention wherein the parts are combined and arranged according to the best mode we have so far devised for the practical application of the principles of our invention.

Figure 1 is a plan view of the unstacking machine, with parts broken away for convenience of illustration. Figure 2 is a view in side elevation, partly in section as at line 2—2 of Figure 1, showing the elevator as descending as the lumber thereon is unstacked and conveyed to the left therefrom by means of the feed chains and the conveyer chains. Figure 3 is an enlarged cross sectional view at line 3—3, of Figure 1, showing the elevator in lowered position, and operating means for the elevator. Figure 4 is an enlarged detail face view and Figure 5 is an edge view of the friction drive for lifting the elevator and for governing its movement. Figure 6 is a detail view of the friction drive and control mechanism for the unstacking chains. Figure 7 is an enlarged detail plan view of the friction drive mechanism for raising and lowering the elevator. Figure 8 is a side view of the mechanism of Figure 7, one of the pulleys being cut out as at line 8—8. Figure 9 is a detail view of the lever control mechanism. Figure 10 is a top view of the bank of levers showing their retaining devices. Figure 11 is an enlarged plan view of a portion of Figure 1 showing the two pivoted or hinged unstacking devices, together with the manual hoist mechanism for controlling the position of the hinged frame, and the friction drive mechanism for the unstacking chains. Figure 12 is a view in elevation of the mechanism of Figure 11 with parts broken away for convenience of illustration. Figure 13 is a perspective view showing one of the feed chains located intermediate the unstacking chain and the off-bearing or conveyer chain.

In order that the general assembly and arrangement of parts of the invention, and the utility of the various parts may readily be understood we have shown a stack or pile 1 of boards made up of layers or courses that are separated by sticks 2 extending transversely of the boards or lumber. The stack is formed in suitable manner on a truck or vehicle 3 having wheels 4 that run on the track rails 5 which are laid on the top or deck 6 of an elevator 7. The elevator, is vertically reciprocable in a pit 8 through the instrumentality of four rack plates or posts 9 located, near the corners of the elevator, and these rack plates co-act with two pairs of rack wheels 10, carried by and spaced apart on their respective horizontal and parallel shafts 11 and 12 that extend longitudinally of the elevator and its pit. On the ends of the shafts, exterior of the pit, are provided gear wheels 13 with which pinions 14 mesh. The pinions are carried by the spaced shafts 15 and 16 exterior of the pit and each shaft has a worm wheel 17 for engagement with a worm 18 on the worm shaft 19 that is journaled transversely of the shafts 15 and 16 and in a lower plane.

For driving these operating parts of the elevator, the pulley 20 of the worm shaft 19 receives power transmitted through belt 21 from the pulley 22 on the drive shaft 23, which latter shaft is provided with a friction disk 24 and journaled in suitable bearings supported in the frame or structure F located at one side of the pit and its elevator. The friction disk may be revolved in two directions for driving the elevator operating mechanism to raise or lower the elevator, and for this purpose two friction wheels 25 and 26 are adapted for alternate frictional engagement with the face of the disk, one wheel being moved into engagement with the disk while the other is being moved out of such engagement.

The two friction wheels are carried by the alined shafts 27 and 28, and the wheel 25 is engaged with the disk for low speed in lifting the loaded elevator, while the wheel 26 is used to drive the elevator at a higher speed for lowering the empty elevator or for lowering the loaded elevator to position so that it may subsequently be intermittently or slowly raised. For the low speed drive we utilize a pulley 29 on shaft 27, chain 30 indicated in dotted lines, Figure 1, and pulley 31 on the power shaft 32, which shaft is used as a line shaft and journaled in suitable bearings in the frame F, in position so that power may readily be transmitted therefrom.

The power shaft, which as shown extends parallel with the rack shafts of the elevator, is driven from an electric motor 33 from its pulley 34 and belt 35 through the pulley 36 on the power shaft, the parts being indicated in Figure 1 with the chain shown by dotted lines.

For lowering the elevator at higher speed, the friction drive is actuated from the power shaft 32 by means of a pulley 37, chain 38 shown by dotted lines, and the pulley 39 on shaft 28.

To permit the friction wheels 25 and 26 to be moved alternately into and out of engagement with the friction disk in the operation of the elevator, the shafts 27 and 28 are journaled in bearings 40 and 41 that are slidable on the bearing plates 42, Figures 7 and 8. As seen in Figure 8 this friction drive mechanism is under control of the manually operated lever 43 in the bank for levers, as 44. The lever 43 is pivoted at 45 and has pivoted to its shorter arm a draw link 46, at the end of which are provided a pair of spaced springs 47 and 48 located at opposite sides of the spring link 49 that is pivoted at 50. A pair of coupling rods 51 and 52, adjustable as to their length, are pivoted to the spring link 49 at opposite sides of its pivot, and these coupling rods are pivotally connected to the separate bearing levers 53 and 54. The bearing levers are pivoted on a common pin 55 supported on the slide plate 42 and each bearing lever is connected by a bearing link 56 to a slide bearing, as 40 and 41 for the friction wheels. Thus by moving the lever 43 on its pivot one of the friction wheels is moved into engagement with the friction disk while the other wheel is simultaneously moved out of engagement with the disk, for reversing the movement of the elevator, with both friction wheels out of engagement of course power is not transmitted from the wheels to the disk. The springs 47 and 48 provide resiliency in the application of the manual power to the spring link, coupling rods, and bearing levers as the friction wheels are shifted, to prevent too sudden frictional engagement between a wheel and the disk, and to absorb and cushion excessive strains in the control mechanism.

In Figures 7 and 8 it will be seen that the lever 43 may be retained at either of the opposite ends of the lever-back 44, in adjusted position by the use of spring pressed, frictional detents 57 and 58 that are affixed at the ends of a plate 59, within the bank. These detents have beveled adjoining ends for the lever to slip over and the detents and plate are supported within the bank by means of bolts 60 about which are coiled springs 61. The springs tend to draw the plate and its detents toward the front wall of the bank and as the lever is moved to right or left in Figure 10 it will be frictionally engaged and retained between the spring pressed detent and the front wall of the bank.

A safety or stop mechanism that is automatically actuated, is provided to prevent excessive upward movement and excessive downward movement of the elevator, and as best seen in Figure 8 a safety link 62, which is pivotally connected to the spring lever 49, is connected to a rock arm 63 on the rock shaft 64. The rock shaft is journaled in bearings supported on the wall of the pit and said shaft is equipped with a second rock arm 65 which is pivotally connected by a vertically disposed link 66 with a tappet arm 67 pivoted within the pit at 68, with its free end in the path of movement of an upper stop arm 69 and a lower stop arm 70 affixed to a suitable portion of the elevator. In Figure 8 the elevator is indicated at its uppermost position, or closely approaching that position, so that if the upward movement is continued, the stop arm 70 will swing the tappet arm 67, and through the described linkage, the spring lever 49 will be swung on its pivot 50 to withdraw the friction wheel of the low speed drive from the friction disk and engage the high speed wheel with the disk to lower the elevator, or the movement of the elevator may be stopped as both friction wheels are thrown out of engagement with the disk.

The unstacking devices, shown as three in number in Figure 1 include three beams 71 which are pivoted on the unstacking shaft 72 that is journaled in the frame F and extends parallel with the elevator operating shafts 11 and 12 in the pit, but these unstacking beams are pivoted in a superstructure of the frame and offset from the pit, in order that the beams may be swung on their pivots to operative or inoperative position, transversely of the pit and of the stack of lumber or boards on the truck. By means of a hoisting cable 73, guide pulley 74 journaled in brackets on the superstructure of the frame F, and drums 75 on the drum shaft 76, the free ends of the unstacking devices may be raised or lowered as the beam is swung on its pivot. The drum shaft and drums are revolved by means of the manually operated winding gear 77, Figure 11 and the unstacking devices are permitted to have a range of movement between the horizontal position of full lines and the raised, angular position in dotted lines of Figure 11.

When in operative position the unstacking devices are disposed in the full line position of Figure 11, extending transversely across the pit above the stack of lumber on the truck, in order that the unstacking chains 78 carried by the beams may transfer the upper layer or course of lumber from the stack, to the left in Figures 1 and 11.

The endless chains 78 are supported on sprocket wheels 79 and 80, the former on the unstacking shaft 72 and the latter journaled in adjustable bearings 81 at the free ends of the beams, a screw bar 82 being indicated for the adjustment. Two tappets 83 are shown on the unstacking chains, and the tappet on the lower flight of the endless chain, as it passes to the left in Figure 11, engages an edge of a course or layer of boards, as shown in Figure 2, where a course is being transferred or shifted laterally of the stack and truck.

The endless chains of the unstacking devices are moved on their sprockets through the shaft 72 which is revolved through its sprocket 84 and chain 85 from the sprocket wheel 86 on the jack shaft 87 that is journaled parallel with the unstacking shaft 72 in the frame F. The jack shaft is revolved through a friction gear 88 keyed thereon by a friction drive wheel or pinion 89 on the shaft 90, and the friction shaft 90 is driven from the power shaft 32 by means of the pulley 91, dotted line belt 92, and pulley 93 as indicated in Figure 1.

In Figure 6 the control of the friction drive 89—88 is indicated, where a slide journal-bearing 94 for the shaft 87 is adjustable on the guide plate 95, and a pivoted hand lever 96 in the lever bank 44 is connected by an adjustable link 97 to the pivoted lever arm 98 which is pivoted at 99 on the plate 95. A short link 100 connects the pivoted lever arm 98 to the slide bearing 94, and it will be apparent that by shifting the lever 96 the large friction gear 88 may be moved toward or away from the smaller drive wheel to receive power therefrom or to be disconnected therefrom. Through the manipulation of the lever 96 at the proper times the unstacking chains are controlled in their operations, and the operator will readily become proficient in the manipulation of the lever for controlling the unstacking devices in the performance of their functions.

As indicated in Figure 2, the unstacking devices deliver the top layer or course of lumber, as it is slid across the sticks 2, from the stack to a series of feed chains 101 complementary to the chains of the unstacking devices. Each of the feed chains is carried on sprockets or toothed wheels 102 and 103 with their journal bearings in a channel shaped housing 104 that is relatively slidable and supported on a fixed beam 105 of the frame F, and this housing may be slid toward or away from the unstacking devices for adjustment therewith of the feed chains 101.

In Figure 12 it will be seen that the feed chains 101 are located in a plane below the unstacking chains 78, and in Figure 2 it will be seen that the feed chains may be adjusted below the unstacking chains in position so that the top layer of boards will be shifted by a tappet 83 along a horizontal plane on top of the feed chains. The housings and their feed chains are shifted or adjusted through manipulation of a hand lever 106 in the bank 44, and this lever is connected by a draw link 107 to a pivoted lever arm 108 pivotally supported on the frame F. At its upper free end the lever arm has a pin and slot connection 109 forming a flexible joint between the lever arm and side plates 110 at one end of the adjustable housing 104, and it will be apparent that by manipulating the lever 106 the housing may be slid longitudinally of the beam 105, between brackets 111 to adjust the feed chains relatively to the unstacking chains. When the housings are properly adjusted the lever 106 may be frictionally clamped in the slotted arm or plate 106a of the bank 44 by nut and bolt 105a Figs. 9 and 10.

For operating the feed chains, over which the boards move laterally, we provide a sprocket wheel 112 on the drive shaft 113 which is journaled in bearings on the frame F beneath the feed chains, and a pulley 114 on the shaft receives power through the belt 115 and pulley 116 on the friction shaft 90, as seen in Figure 1.

As the feed chains receive the course of lumber from the unstacking chains, the feed chains deliver the boards to a set of off-bearing or conveyer chains 117 that deposit the successive boards at a suitable place. These chains 117, which are endless, travel at a higher speed than the feed chains so that as the layer of boards is deposited on the conveyer chains, the boards are separated or spaced at regular intervals, and this spacing renders visible the top and two edges of each board, exposing these three faces for inspection in order that the material may be properly graded in suitable manner.

The endless conveyer chains are supported on pairs of sprockets 118 journaled in bearings in the frame F and they are driven from the shaft 90 (Figure 1) through the bevel gear couple 119 and counter shaft 120, or in other suitable manner.

In Figures 4 and 5 a clutch mechanism is illustrated for the friction drive of the elevator operating mechanism, the usual clutch device A being connected by linkage C with the friction drive for operating the unstacking devices, and under control of the pedal B.

From the above description taken in connection with our drawings it will be understood that a flexible control of the friction drives for operating the several parts of the machine is compactly and conveniently arranged for ready access by the operator of the machine, and with a little practice, the operation and control of all parts of the machine is readily maintained for efficient performance of the functions of the machine.

Having thus fully described our invention, what we claim as new and desire to secure by Letters Patent is:—

1. In an unstacking machine, the combination with an unstacking device, of a frame, a movable housing thereon and means for adjusting said housing with relation to the unstacking device, and a feed chain mounted in said housing.

2. In an unstacking machine, the combination with a stationary frame, of a housing slidable thereon, a feed chain mounted in said housing and means for driving the feed chain, and lever operated mechanism between said frame and housing for adjusting the latter.

In testimony whereof we affix our signatures.

ALBERT E. BRONSON.
ALFRED M. BRADEN.